United States Patent
Sandstrom

(10) Patent No.: US 11,478,040 B2
(45) Date of Patent: Oct. 25, 2022

(54) FOOTWEAR AND RUBBER SOLE CONTAINING ZINC ROSINATE

(71) Applicant: The Goodyear Tire & Rubber Company, Akron, OH (US)

(72) Inventor: Paul Harry Sandstrom, Cuyahoga Falls, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 138 days.

(21) Appl. No.: 16/519,952

(22) Filed: Jul. 23, 2019

(65) Prior Publication Data

US 2020/0146393 A1  May 14, 2020

Related U.S. Application Data

(60) Provisional application No. 62/758,720, filed on Nov. 12, 2018.

(51) Int. Cl.

| | |
|---|---|
| A43B 13/04 | (2006.01) |
| C08K 5/09 | (2006.01) |
| C08K 3/04 | (2006.01) |
| C08K 3/36 | (2006.01) |
| C08L 9/06 | (2006.01) |
| C08K 5/54 | (2006.01) |
| C08K 5/372 | (2006.01) |
| C08K 5/5415 | (2006.01) |
| C08K 5/098 | (2006.01) |

(52) U.S. Cl.
CPC ........... *A43B 13/04* (2013.01); *C08K 3/04* (2013.01); *C08K 3/36* (2013.01); *C08K 5/09* (2013.01); *C08K 5/372* (2013.01); *C08K 5/5406* (2013.01); *C08K 5/5415* (2013.01); *C08L 9/06* (2013.01); *C08K 5/098* (2013.01)

(58) Field of Classification Search
CPC .......... A43B 13/04; C08K 5/09; C08K 5/046; C08K 5/5415; C08K 5/098; C08K 5/01; C08K 3/04; C08K 3/36; C08K 3/22; C08L 9/00; C08L 9/06
See application file for complete search history.

(56) References Cited

U.S. PATENT DOCUMENTS

| | | | |
|---|---|---|---|
| 6,670,416 B1 | 12/2003 | Blok et al. | |
| 6,710,116 B1 * | 3/2004 | Waddell | B60C 1/0025 524/515 |
| 6,939,921 B2 | 9/2005 | Waddell et al. | |
| 7,134,468 B2 | 11/2006 | Sandstrom | |
| 7,249,621 B2 | 7/2007 | Sandstrom | |
| 7,737,204 B2 | 6/2010 | Sandstrom | |
| 7,928,157 B2 | 4/2011 | Sandstrom et al. | |
| 9,163,126 B2 | 10/2015 | Sandstrom | |
| 9,873,780 B1 | 1/2018 | Sandstrom | |
| 10,632,788 B2 | 4/2020 | Miyazaki | |
| 2003/0096904 A1 * | 5/2003 | Hakuta | C08F 230/08 524/588 |
| 2006/0000532 A1 | 1/2006 | Sandstrom | |
| 2006/0021688 A1 | 2/2006 | Sandstrom | |
| 2008/0066840 A1 | 3/2008 | Sandstrom et al. | |
| 2010/0160513 A1 | 6/2010 | Sandstrom | |
| 2012/0059121 A1 * | 3/2012 | Backer | C08K 5/5425 524/856 |
| 2012/0101193 A1 | 4/2012 | Sandstrom | |
| 2013/0318835 A1 * | 12/2013 | Mutsuda | B32B 27/40 36/30 R |
| 2015/0361253 A1 | 12/2015 | Kimura | |
| 2017/0114212 A1 | 4/2017 | Pompei et al. | |
| 2017/0210881 A1 | 7/2017 | Miyazaki | |
| 2017/0361658 A1 | 12/2017 | Sanders et al. | |

FOREIGN PATENT DOCUMENTS

| | | |
|---|---|---|
| CN | 105801926 A | 7/2016 |
| EP | 2033813 B1 | 10/2010 |

OTHER PUBLICATIONS

Chinese Search Report for Serial No. 201911100750.5 dated Sep. 3, 2021.

* cited by examiner

*Primary Examiner* — Robert S Jones, Jr.
(74) *Attorney, Agent, or Firm* — Mandy B. Willis; John D. DeLong

(57) ABSTRACT

The invention relates to a footwear with a rubber sole where such sole is comprised of a rubber composition which contains zinc rosinate. The zinc rosin is provided to include zinc rosinate as a product formed in situ within the rubber composition of zinc oxide and freely added rosin acid. The footwear rubber sole is intended for ground engagement. In one embodiment, the rubber composition for the rubber sole further contains triglyceride vegetable oil. In one embodiment, the rubber composition for the rubber sole additionally contains a traction promoting resin.

18 Claims, No Drawings

FOOTWEAR AND RUBBER SOLE CONTAINING ZINC ROSINATE

FIELD OF THE INVENTION

The invention relates to a footwear with a rubber sole where such sole is comprised of a rubber composition which contains zinc rosinate. The zinc rosin is provided to include zinc rosinate as a product formed in situ within the rubber composition of zinc oxide and freely added rosin acid. The footwear rubber sole is intended for ground engagement. In one embodiment, the rubber composition for the rubber sole further contains triglyceride vegetable oil. In one embodiment, the rubber composition for the rubber sole additionally contains a traction promoting resin.

BACKGROUND OF THE INVENTION

It is sometimes desirable for footwear to have a sole comprised of a rubber composition intended to promote wet or dry traction upon ground engagement. Such traction may sometimes be referred to as grip. It is often also desirable to provide such sole of a rubber composition to promote adaptability over a wide range of atmospheric temperatures such as, for example, from cold winter conditions to hot summer conditions.

For such purpose it is proposed to evaluate providing the rubber sole with a rubber composition containing zinc rosinate as a product of zinc oxide and rosin acid in situ within the rubber composition.

Such rosin acid is composed of freely added rosin acid together with any rosin acid which may be contained in an elastomer used in the footwear sole rubber composition. For example, emulsion polymerization prepared butadiene/styrene elastomer (ESBR) may contain from about 2 to about 3 parts by weight rosin acid per 100 parts by weight of the elastomer derived from the emulsion polymerization based production of the elastomer. The term "freely added" relates to rosin acid added as a compounding ingredient to the rubber composition which is in addition to rosin acid which may be contained in an elastomer used in the footwear sole rubber composition. Cis 1,4-polyisoprene elastomer, cis 1,4-polybutadiene elastomer and organic solvent solution polymerization prepared styrene/butadiene elastomer (SSBR) are not likely to contain any appreciable amount, if any, of rosin acid.

In practice, a conventional article of footwear includes a combination of two primary elements, namely an upper portion and a sole portion where the sole portion is intended to permit ground engagement. The upper portion of the footwear provides a covering for the foot of the wearer of the footwear and positions the foot with respect to the sole portion. The sole portion is secured to a lower part of the upper portion of the footwear and, in practice, is intended to be positioned between the upper portion and the ground upon ground engagement. The sole portion provides traction through its sole outer surface upon ground engagement and aids in controlling foot balance and control for the footwear. Accordingly, the upper portion and secured sole portion operate in a cooperative combination to provide a footwear structure suitable for one or more ambulatory activities such as, for example, walking, running and sports related activities.

In practice, rubber compositions for rubber soles for footwear typically contain a zinc fatty acid salt as a reaction product in situ within the rubber composition of zinc oxide with at least one fatty acid containing and desirably comprised of, for example, at least one of stearic, palmitic and oleic acids. In one aspect, emulsion polymerization prepared ESBR normally contains such residual fatty acid in addition to the aforesaid residual rosin acid, (e.g. about 2 to about 3 parts by weight of residual fatty acid per 100 parts by weight of the ESBR), as a result of its emulsion polymerization preparation process. The resulting zinc salt of such fatty acids is a relatively slippery soap in the presence of water. A portion of the zinc fatty acid salt within the rubber composition gradually migrates to and blooms on the outer surface of the rubber composition and thereby to the outer surface of the footwear sole intended for ground contacting.

It is proposed to evaluate providing such footwear sole rubber composition with zinc rosinate to a substantial exclusion of such zinc fatty acid salt.

The zinc rosinate is considered to be a soap, whereas the rosin acid from which it is derived is not considered to be a fatty acid compared to stearic, palmitic and oleic acids and therefore the zinc rosinate is considered to be significantly differentiated from such products of such fatty acids with zinc oxide. For example, the zinc rosinate is considered to be a relatively sticky soap in the presence of water compared to the aforesaid slippery zinc fatty acid soap, and therefore the zinc rosinate may serve to more effectively promote a combination of wet and dry traction (traction of the footwear sole surface on various substrates under wet and dry substrate surface conditions). Such traction may sometimes referred to as "grip", particularly where the sole rubber surface becomes wet as may be experienced where the sole surface engages a wet surface.

It is therefore, as indicated, proposed to evaluate providing zinc rosinate within the footwear sole rubber composition instead of, or by replacing at least a portion of, zinc salt of fatty acids such as, for example stearic, palmitic and oleic acids which might normally be provided in the preparation of the rubber composition such as by free addition of such fatty acid and/or by such fatty acid contained in an elastomer (e.g. ESBR if used) of the rubber composition. Zinc rosinate, also as indicated, would be provided as a product of zinc oxide and rosin acid formed in situ within the rubber composition of the footwear sole, where a portion of the zinc rosinate product inherently migrates (blooms) to the outer surface of the footwear rubber sole (and thereby is contained on the surface of the footwear rubber sole intended for substrate surface engagement) to thereby promote wet traction of the sole surface intended for ground engagement (e.g., promote traction of the footwear rubber sole surface in contact with ground surface, particularly a wet ground surface).

In one embodiment it is proposed to also provide the footwear sole rubber composition with triglyceride vegetable oil (e.g. containing or comprised of, for example, at least one of soybean, sunflower, palm oil and rapeseed oil) to promote processing of the uncured rubber composition and to promote usefulness of the cured (e.g. sulfur cured) footwear rubber sole rubber over a wide range of temperatures.

In the description of this invention, the terms "compounded" rubber compositions and "compounds"; where used refer to the respective rubber compositions which have been compounded with appropriate compounding ingredients. The terms "rubber" and "elastomer" may be used interchangeably unless otherwise indicated. The amounts of materials are usually expressed in parts of material per 100 parts of rubber by weight (phr).

DISCLOSURE AND PRACTICE OF THE INVENTION

In accordance with this invention, a footwear rubber sole is comprised of a rubber composition which contains zinc rosinate within said rubber composition and on the outer surface of said sole intended for ground engagement (substrate surface engagement) where said zinc rosinate is the product formed in situ within the rubber composition of zinc oxide and freely added rosin acid.

In practice, said footwear rubber sole rubber composition is comprised of, based upon parts by weight per 100 parts by weight rubber (phr):

(A) (100 phr of) at least one elastomer, desirably at least one conjugated diene-based elastomer, (B) about 1 to about 10, alternately about 3 to about 10, phr of zinc soap comprised of:
   (1) zinc rosinate as the product of zinc oxide and freely added rosin acid formed in situ within the rubber composition, or
   (2) a combination of zinc soaps comprised of:
      (a) about 25 to about 95, alternately about 50 to about 95 weight percent of said zinc rosinate, and
      (b) about 5 to about 75, alternately about 5 to about 50 weight percent of zinc salt as the product of zinc oxide and fatty acid formed in situ within the rubber composition, where said fatty acid contains, and desirably is comprised primarily of a combination of, at least one of stearic, palmitic and oleic acids.

The zinc rosinate as a product of zinc oxide and freely added rosin acid is in addition to any zinc rosinate formed in situ within the rubber composition from zinc oxide and residual rosin acid contained in an elastomer used in the rubber composition which may be, for example, about 2 to about 3 parts by weight per 100 parts by weight of the elastomer. Therefore, the rubber composition may contain additional zinc rosinate derived from zinc oxide and residual rosin acid in an elastomer contained in the rubber composition. Representative of such residual rosin acid containing elastomer is an aqueous emulsion polymerization prepared styrene/butadiene rubber (ESBR).

Representative of an elastomer containing a residual rosin acid in aqueous emulsion polymerization prepared styrene/butadiene rubber (ESBR) which may generally contain from about 2 to about 3 parts by weight rosin acid per 100 parts by weight of the ESBR contributed by soaps used in the polymerization process in formation of the ESBR. Therefore, a footwear rubber sole rubber composition which contains ESBR, may contain a combination of freely added rosin acid in an amount of from about 1 to about 10 phr in the rubber composition together with an additional about 2 to about 3 parts by weight of residual rosin acid per 100 parts of the ESBR contained in the rubber composition.

In practice, the rosin acids include at least one of gum rosin acid, wood rosin acid and tall oil rosin acid, and hydrogenated and disproportionate forms thereof, which are well known to those skilled in such art. For example, see "Rosin and Rosin Derivatives", found in the *Encyclopedia of Chemical Technology*, Second Edition, 1968, Pages 475 through 508.

In practice, said footwear rubber sole contains said zinc rosinate based zinc soap within its rubber composition and on its outer surface (to which a portion thereof has autogenously migrated) intended for ground contacting, particularly when contacting wet surface.

In one embodiment said footwear rubber sole is comprised of a rubber composition which also contains, for example, from about 2 to about 40, alternately about 5 to about 25, parts by weight per 100 parts by weight elastomer, (phr) rubber processing oils comprised of:
   (A) petroleum based rubber processing oil,
   (B) triglyceride vegetable oil, or
   (C) combination of a petroleum based rubber processing oil and triglyceride vegetable oil containing, for example, from about 40 to about 90, alternately from about 60 to about 90, weight percent of said triglyceride vegetable oil.

Representative of such triglyceride vegetable oils may be, for example, at least one of soybean oil, sunflower oil, palm oil and rapeseed with soybean oil and sunflower oils being desirable vegetable oils.

In one embodiment, said footwear rubber sole rubber composition also contains at least one traction promoting resin which is desirably comprised of, for example, at least one of styrene/alphamethylstyrene resin, coumarone-indene resin, petroleum hydrocarbon resin, terpene polymer, terpene phenol resin and rosin derived resin and copolymers thereof.

In one embodiment, the traction promoting resin is a styrene/alphamethylstyrene resin. Such styrene/alphamethylstyrene resin may be, for example, a relatively short chain copolymer of styrene and alphamethylstyrene. In one embodiment, such a resin may be suitably prepared, for example, by cationic copolymerization of styrene and alphamethylstyrene in a hydrocarbon solvent. The styrene/alphamethylstyrene resin may have, for example, a styrene content in a range of from about 10 to about 90 percent. The styrene/alphamethylstyrene resin may have a softening point, for example, in a range of from about 60° C. to about 125° C., alternately from about 80° C. to about 90° C. (ASTM E28). A suitable styrene/alphamethylstyrene resin may be, for example, Resin 2336™ from Eastman or Sylvares SA85™ from Arizona Chemical.

In one embodiment, the resin is a coumarone-indene resin. Such coumarone-indene resin may have a softening point, for example, in a range of from about 30° C. to about 150° C. containing coumarone and indene as the monomer components making up the resin skeleton (main chain). Minor amounts of monomers other than coumarone and indene may be incorporated into the skeleton such as, for example, methyl coumarone, styrene, alphamethylstyrene, methylindene, vinyltoluene, dicyclopentadiene, cycopentadiene, and diolefins such as isoprene and piperlyene.

In one embodiment, the resin is a petroleum hydrocarbon resin. Such petroleum hydrocarbon resin may be, for example, an aromatic and/or nonaromatic (e.g. paraffinic) based resin. Various petroleum resins are available. Some petroleum hydrocarbon resins have a low degree of unsaturation and high aromatic content, whereas some are highly unsaturated, and yet some contain no aromatic structure at all. Differences in the resins are largely due to the olefins contained in the petroleum based feedstock from which the resins are derived. Conventional olefins for such resins include any C5 olefins (olefins and di-olefins containing an average of five carbon atoms) such as, for example, cyclopentadiene, dicyclopentadiene, isoprene and piperylene, and any C9 olefins (olefins and di-olefins containing an average of 9 carbon atoms) such as, for example, vinyltoluene and alphamethylstyrene. Such resins may be made from mixtures of such C5 and C9 olefins and di-olefins.

In one embodiment, said resin is a terpene resin. Such resin may be comprised of, for example, polymers of at least one of limonene, alpha pinene and beta pinene and having a softening point in a range of from about 60° C. to about 160° C.

In one embodiment, the resin is a terpene-phenol resin. Such terpene-phenol resin may be, for example, a copolymer of phenolic monomer with a terpene such as, for example, limonene and pinene.

In further accordance with this invention, said rubber composition for said footwear rubber sole rubber composition is provided as being sulfur cured.

In practice, various elastomers, including conjugated diene-based elastomers, may be used for the sole rubber composition intended for ground contacting.

Representative of such elastomers are polymers comprised of at least one of isoprene and 1,3-butadiene and copolymers of styrene and at least one of isoprene and 1,3-butadiene.

Representative examples of such elastomers are, for example, comprised of cis 1,4-polyisoprene rubber, cis 1,4-polybutadiene rubber, styrene/butadiene copolymer rubber which may be at least one of emulsion polymerization prepared ESBR (containing from about 2 to about 3 parts by weight per 100 parts by weight rosin acid) and solution polymerization prepared SSBR, styrene/isoprene/butadiene rubber and isoprene/butadiene rubber as well as block polymers comprised of styrene/isoprene/styrene and of styrene/butadiene/styrene polymer blocks.

Such footwear sole rubber composition may also, if appropriate, contain up to about 25 phr of primarily saturated elastomers such as, for example, elastomers comprised of EPDM (ethylene/propylene/non-conjugated diene terpolymer rubber), butyl rubber (copolymer of isobutylene and minor amount such as, for example, about 3 to 6 percent, of conjugated diene such as, for example, isoprene), halobutyl rubber (halogenated butyl rubber such as, for example, chlorobutyl and brominated butyl rubber) and brominated copolymers of paramethylstyrene and isobutylene and their mixtures. Non-conjugated dienes for said EPDM rubber may be, for example, at least one of ethylidene norbornadiene, trans 1,4-hexadiene and dicyclopentadiene.

In one aspect, said footwear sole rubber composition may also contain from about 10 to about 120, alternately from about 25 to about 75, phr of particulate reinforcing fillers comprised of:
(A) carbon black, or
(B) precipitated silica (amorphous synthetic silica), or
(C) a combination of rubber reinforcing carbon black and precipitated silica such as, for example, from about 2 to about 100 phr of rubber reinforcing carbon black and from about 10 to about 100 phr of precipitated silica (amorphous synthetic silica).

In one embodiment, the reinforcing filler provided for the rubber introduced into the may comprise precipitated silica in a form of hydrophobic precipitated silica where said hydrophobic precipitated silica is a product of precipitated silica (hydrophilic precipitated silica) pre-treated prior to with silica coupling agent comprised of at least one of bis(3-triethoxysilylpropyl) polysulfide having an average of about 2 to about 4 connecting sulfur atoms in its polysulfidic bridge or an alkoxyorganomercaptosilane.

The footwear sole rubber composition may also contain less reinforcing fillers (fillers with little rubber reinforcing effect) such as, for example, at least one of clay, talc, and calcium carbonate which may be present in an amount of, for example, up to about 10 phr.

The precipitated silica may optionally, and usually desirably, be used in combination with a silica coupler to couple the precipitated silica to the diene-based elastomer(s) of the footwear sole rubber composition to enhance a rubber reinforcing effect of the precipitated silica. Where the precipitated silica is used in the sole rubber composition, such silica couplers for precipitated silica in a diene-based rubber containing rubber composition are well known and typically have a moiety reactive with hydroxyl groups (e.g. such as silanol groups) contained on the silica and another moiety interactive with the elastomer(s), particularly conjugated diene-based elastomers, to create a silica-to-rubber coupling effect.

In practice, a silica coupler ("coupling agent") may be, for example, (A) a bis-(3-trialkoxysilylalkyl) polysulfide having an average of from 2 to about 4, sometimes more desirably an average of from 2 to about 2.6 or from about 3.4 to about 4, connecting sulfur atoms in its polysulfidic bridge, representative of which is a bis-(3-triethoxysilylpropyl) polysulfide, or (B) an organoalkoxymercaptosilane composition, such as for example an organoalkoxymercaptosilane of the general Formula (I) represented as:

$$(X)_n(R_7O)_{3-n}—Si—R_8—SH \qquad (I)$$

wherein X is a radical selected from a halogen, namely chlorine or bromine and preferably a chlorine radical, and from alkyl radicals having from one to 16, preferably from one through 4, carbon atoms, preferably selected from methyl, ethyl, propyl (e.g. n-propyl) and butyl (e.g. n-butyl) radicals; wherein $R_7$ is an alkyl radical having from 1 through 18, alternately 1 through 4, carbon atoms preferably selected from methyl and ethyl radicals and more preferably an ethyl radical; wherein $R_8$ is an alkylene radical having from 1 to 16, preferably from 1 through 4, carbon atoms, preferably a propylene radical; and n is an average value of from zero through 3, preferably zero, and wherein, in such cases where n is zero or 1, $R_7$ may be the same or different for each ($R_7O$) moiety in the composition, and (C) said organoalkoxyomercaptosilane of the general Formula (I) capped with a moiety which uncaps the organoalkoxymercaptosilane upon heating to an elevated temperature.

Representative examples of various organoalkoxymercaptosilanes are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, tripropoxy mercaptopropyl silane, ethoxy dimethoxy mercaptopropylsilane, ethoxy diisopropoxy mercaptopropylsilane, ethoxy didodecyloxy mercaptopropylsilane and ethoxy dihexadecyloxy mercaptopropylsilane.

A representative example of a capped organoalkoxymercaptosilane coupling agent which may be used in this invention is a liquid 3-octanoylthio-1-propyltriethoxysilane as NXT™ silane from the GE Silicones Company.

The coupling agent may, for example, be added directly to the rubber composition or may be added to the rubber composition as a composite of precipitated silica pre-treated with the coupling agent. For example, said precipitated silica may be pre-treated to form a composite thereof prior to addition to the rubber composition, such as for example, pre-treated with at least one of:
(A) an alkylsilane of the general Formula (II),
(B) said bis(3-triethoxysilylpropyl) polysulfide having an average of from about 2 to about 4 connecting sulfur atoms in its polysulfidic bridge,
(C) organoalkoxymercaptosilane such as, for example, the organoalkoxymercaptosilane of general Formula (I), (D) a combination of alkylsilane such as, for example the alkylsilane of general Formula (II) and said bis(3-triethoxysilylpropyl) polysulfide having an average of from about 2 to about 4 connecting sulfur atoms in its polysulfidic bridge, and (E) a combination of said alkylsilane and organoalkoxymercaptosilane such as for example, the alkylsilane of general Formula (II) and organoalkoxymercaptosilane of general Formula (I);

wherein said alkylsilane of the general Formula (II) may be represented as:

$$X_n-Si-R_{6(4-n)} \tag{II}$$

wherein $R_6$ is an alkyl radical having from 1 to 18 carbon atoms, preferably from 1 through 4 carbon atoms; n is a value of from 1 through 3; X is a radical selected from the group consisting of halogens, preferably chlorine, and alkoxy groups selected from methoxy and ethoxy groups, preferably an ethoxy group.

A significant consideration for said pre-treatment of said silica is to reduce, or eliminate, evolution of alcohol in situ within the rubber composition during the mixing of the silica with said elastomer such as may be caused, for example, by reacting such coupling agent contained within the elastomer composition with hydroxyl groups (e.g. silanol groups) contained on the surface of the silica.

In further accordance with this invention, an article of footwear is provided which contains said rubber sole.

In practice, said article of footwear includes a combination of two primary elements, comprised of an upper portion and a sole portion of which at least a portion thereof is intended to permit ground engagement. The upper portion of the footwear provides a covering for the foot of the wearer of the footwear and positions the foot with respect to the sole portion. The sole portion is secured to a lower part of the upper portion of the footwear. The sole portion aids in controlling foot balance. Accordingly, the upper portion and secured sole portion cooperatively provide a footwear structure suitable for one or more ambulatory activities such as, for example, walking, running and sports related activities.

It is readily understood by those having skill in the art that the rubber compositions for said sole would be compounded by methods generally known in the rubber compounding art, such as mixing the various sulfur-vulcanizable constituent rubbers with various commonly used additive materials such as, for example, curing aids such as sulfur, activators, retarders and accelerators, processing additives, such as the aforesaid rubber processing oils, resins including tackifying resins, silicas, and plasticizers, fillers, pigments, waxes, antioxidants and antiozonants, peptizing agents and reinforcing fillers such the aforesaid rubber reinforcing carbon black and precipitated silica. As known to those skilled in the art, depending on the intended use of the sulfur vulcanizable and sulfur-vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of antioxidants, where used, may comprise about 1 to about 5 phr. Representative antioxidants, where used, may be, for example, diphenyl-p-phenylenediamine and others, such as, for example, those disclosed in *The Vanderbilt Rubber Handbook* (1978), Pages 344 through 346. Typical amounts of antiozonants, where used, may comprise about 1 to about 5 phr. Typical amounts of waxes, if used, may comprise about 1 to about 5 phr. Often microcrystalline waxes are used. Typical amounts of peptizers, if used, may comprise about 0.1 to about 1 phr. The presence and relative amounts of the above additives are not considered to be an aspect of the present invention, unless otherwise noted herein, which is more primarily directed to the utilization of zinc rosinate in place of zinc fatty acid salts as a product of zinc oxide and rosin acid formed in situ within the tread rubber composition and on its running surface.

The vulcanization is conducted in the presence of a sulfur-vulcanizing agent. Examples of suitable sulfur vulcanizing agents include elemental sulfur (free sulfur) or sulfur donating vulcanizing agents.

Accelerators are used to control the time and/or temperature required for vulcanization and to improve the properties of the vulcanizate. In one embodiment, a single accelerator system may be used, i.e., primary accelerator. Conventionally, a primary accelerator may be used, for example, in amounts ranging from about 0.5 to about 2 phr. In another embodiment, combinations of two or more accelerators in which the primary accelerator is generally used in the larger amount (0.5 to 2 phr, for example), and a secondary accelerator which is generally used in smaller amounts (0.05 to 0.5 phr, for example) in order to activate and to improve the properties of the vulcanizate. In addition, delayed action accelerators may be used. Often the primary accelerator is a sulfenamide. If a second accelerator is used, the secondary accelerator may be, for example, a guanidine compound. The presence and relative amounts of sulfur vulcanizing agent and accelerator(s) are not considered to be an aspect of this invention which is more primarily directed to inclusion of the aforesaid zinc rosinate in a footwear sole rubber composition.

The sole rubber composition may be shaped, molded and cured by various methods which are readily apparent to those having skill in such art.

The invention may be further understood by reference to the following examples in which the parts and percentages are by weight unless otherwise indicated.

EXAMPLE I

This Example, derived from Example I of U.S. Pat. No. 7,928,157 for a tire tread and rubber composition, relates to providing zinc rosinate in a rubber composition as a product of zinc oxide with rosin acid formed in situ within the rubber composition and thereby relates to the aforesaid evaluation of providing such zinc rosinate in a footwear rubber sole rubber composition.

Rubber composition Samples A through F were prepared, with Sample A being a control Sample formulated with a combination of zinc oxide and the addition of one phr of a fatty acid mixture of stearic, palmitic and oleic acids to form zinc stearate, zinc palmitate and zinc oleate in situ within the rubber composition. Samples B and C were formulated with an addition of 3 and 5 phr of the fatty acid mixture, respectively so that, in a sense, they are also control samples.

Experimental Samples D, E and F were formulated with rosin acid (instead of adding the fatty acid mixture) in amounts of 1, 3 and 5 phr of rosin acid, respectively to form zinc rosinate in situ within the rubber compositions.

The rubber composition samples were prepared by mixing the elastomers(s) together with reinforcing fillers and other rubber compounding ingredients in a first non-productive mixing stage (NP) in an internal rubber mixer for about 4 minutes to a temperature of about 160° C. The mixture is then further sequentially mixed in a second non-productive mixing stage (NP) in an internal rubber mixer (no additional ingredients added) for about 3 minutes to a temperature of about 160° C. The resulting mixture is then mixed in a productive mixing stage (P) in an internal rubber mixer with curatives for about 2 minutes to a temperature of about 110° C. The rubber composition is cooled to below 40° C. between each of the non-productive mixing steps and between the second non-productive mixing step and the productive mixing step.

The basic formulation for the rubber samples is presented in the following Table 1.

TABLE 1

|  | Parts |
|---|---|
| First Non-Productive Mixing Step (NP1) | |
| Natural rubber[1] | 100 |
| Carbon black[2] | 50 |
| Rubber processing oil | 5 |
| Zinc oxide | 5 |
| Antioxidant[3] | 2 |
| Fatty acids, excluding rosin acid[4] | 0, 1, 3, 5 |
| Rosin acid[5,] excluding fatty acids | 0, 1, 3, 5 |
| Productive Mixing Step (P) | |
| Sulfur | 1.4 |
| Accelerator(s)[6] | 1 |

[1]TSR 20 natural rubber, which would ordinarily contain an average of from about 0.03 to about 1 weight percent naturally occurring (not free addition) $C_{18}$ fatty acids which may include naturally occurring stearic acid
[2]N299 rubber reinforcing carbon black, an ASTM designation
[3]Quinoline type
[4]Blend comprised of stearic, palmitic and oleic acids
[5]As gum rosin acid from the Eastman Chemical Company
[6]Sulfenamide and guanidine types The following Table 2 illustrates cure behavior and various physical properties of rubber compositions based upon the basic recipe of Table 1 and reported herein as a control Sample A, B and C, including Samples D, E and F formulated with rosin acid and zinc oxide.

TABLE 2

| | Rubber Samples | | | | | |
|---|---|---|---|---|---|---|
| | Control A | B | C | D | E | F |
| Fatty acids,(phr) | 1 | 3 | 5 | 0 | 0 | 0 |
| Rosin acid (phr) | 0 | 0 | 0 | 1 | 3 | 5 |
| Rheometer, 150° C., MPa | | | | | | |
| Maximum torque | 17.5 | 17.4 | 16.9 | 16.8 | 15.4 | 14.5 |
| Minimum torque | 3.1 | 3 | 2.8 | 3.4 | 3.1 | 3.2 |
| Delta torque | 14.4 | 14.4 | 14.1 | 13.4 | 13.3 | 11.3 |
| T90 (minutes) | 11.5 | 13.6 | 15 | 13 | 15.1 | 17.1 |
| Stress-strain, AThu[1], 14 min, 160° C. | | | | | | |
| Tensile strength (MPa) | 24.4 | 24.7 | 22.9 | 22 | 21.8 | 22.2 |
| Elongation at break (%) | 469 | 451 | 418 | 468 | 490 | 524 |
| 300 % modulus, ring (MPa) | 14 | 15.4 | 16 | 12.4 | 11.5 | 10.2 |
| Rebound | | | | | | |
| 23° C. | 51 | 50 | 49 | 49 | 47 | 46 |
| 100° C. | 63 | 64 | 63 | 60 | 58 | 57 |
| Shore A Hardness | | | | | | |
| 23° C. | 63 | 67 | 68 | 63 | 64 | 63 |
| 100° C. | 59 | 61 | 60 | 59 | 58 | 57 |

TABLE 2-continued

| | Rubber Samples | | | | | |
|---|---|---|---|---|---|---|
| | Control A | B | C | D | E | F |
| Coefficient of Friction[2] | | | | | | |
| Average coefficient, on a dry substrate | 3.28 | 3.55 | 3.08 | 3.48 | 3.26 | 3.15 |
| Average coefficient, on a wet substrate | 0.98 | 1.07 | 1.05 | 1.2 | 1.45 | 2.11 |
| Pendulum Skid Resistance[3] | | | | | | |
| On wet concrete substrate | 45 | 44 | 45 | 49 | 49 | 49 |
| On wet asphalt substrate | 56 | 55 | 57 | 56 | 57 | 60 |

1Automated Testing System instrument of the Instron Corporation
2ASTM D-1894: a coefficient of friction (COF) value for a rubber sample may be measured, for example, on a Model SP-2000 slip/peel tester from IMASS Inc. at six inches (about 15.2 cm) per minute using a 200 g sled against a substrate surface such as, for example, a polished aluminum surface
3A laboratory test to measure resistance of a rubber sample to movement over a substrate surface and is considered herein as being less sensitive to variation in values of resistance to movement over a substrate surface than the above coefficient of friction test From Table 2, it can be seen that the dry coefficient friction values for Samples A through F show an increase of values for 1 and 3 phr of rosin acid as compared to 1 and 3 phr of the fatty acid with a higher value at 3 phr for the fatty acid when compared to the rosin acid addition, thus suggesting a possible advantage for rosin acid at dry substrate conditions. However, the coefficient of friction values for Samples D, E and F (which contained the zinc rosinate salt instead of the zinc fatty acid salts (formed in situ within the rubber composition as a product of rosin acid and zinc oxide) were dramatically improved for wet substrate conditions as compared to Samples A, B and C which contained the zinc fatty acid salts without the zinc rosinate salt being present.

From Table 2 it can further be seen that the wet skid resistant values confirmed the above coefficient values as being significantly improved for Samples D, E and F which contained the zinc rosinate instead of the zinc fatty acid salts of Samples A, B and C.

Accordingly, it is concluded herein that a footwear rubber sole of a rubber composition containing a zinc soap in the form of zinc rosinate can promote a significantly improved coefficient of friction of the sole's surface intended for contacting or engaging a wet substrate surface while substantially maintaining or improving a coefficient of friction on a dry substrate surface.

EXAMPLE II

This Example, derived from an example presented in U.S. Pat. No. 9,163,126 for a tire tread and rubber composition, relates to providing zinc rosinate in a rubber composition as a product of zinc oxide with rosin acid formed in situ within the rubber composition and thereby relates to the aforesaid evaluation of providing such zinc rosinate in a footwear rubber sole rubber composition.

For this Example, rosin acid was introduced in a rubber composition in combination with zinc oxide to enable an in situ formation of zinc rosinate within the rubber composition, Silica-rich rubber compositions were prepared as rubber Samples G through L. Rubber Sample G was a control rubber sample formulated with 3 phr of zinc oxide and 1 phr of fatty acids comprised of stearic, palmitic and oleic acids to form salts of such fatty acids in situ within the rubber composition. Rubber Samples H and I were formulated with 3 phr and 6 phr of the fatty acids, respectively, while maintaining 3 phr of zinc oxide. Rubber Samples J, K and L were formulated with 3 phr zinc oxide and rosin acid (instead of the aforesaid fatty acids) in amounts of 1, 3 and 6 phr of rosin acid, respectively, to form zinc rosinate in situ within the rubber composition.

The following Table 3 illustrates a summary of the formulations.

TABLE 3

| | Parts |
|---|---|
| Non-Productive Mixing Stage (4 min to 170° C. drop temperature) | |
| Solution styrene/butadiene rubber (SBR)[1] | 74 |
| Cis 1,4-polybutadiene rubber[2] | 26 |
| Precipitated silica[3] | 73 |
| Carbon black | 10 |
| Processing oil, wax | 9 |
| Silane coupling agent[4] | 6.5 |
| Antidegradant[5] | 3 |
| Zinc oxide | 3 |
| Traction resin[6] | 5 |
| Fatty acids (G-I) or rosin acid[7] (J-L) | 1, 3 and 6 |
| Second Non-productive Mixing Stage | |
| Additional mixing - 3 minutes at 160° C. Productive Mixing Stage (2 minutes to 120° C. drop temperature) | |
| Sulfur | 1.9 |
| Sulfenamide accelerator | 1.7 |
| Diphenyl guanidine accelerator | 1.5 |

[1]SLF31X22 from The Goodyear Tire & Rubber Company
[2]Budene 1207 from The Goodyear Tire & Rubber Company
[3]Z1165MP ™ from Rhone-Poulenc
[4]NXT ™ from GE Silicones
[5]Amine type
[6]Coumarone-indene resin
[7]Gum rosin The rubber composition samples were prepared by mixing the elastomers together with the identified rubber compounding ingredients in a first non-productive mixing stage (NP) in an internal rubber mixer for about 4 minutes at a temperature of about 170° C. The mixture was then further sequentially mixed in a second non-productive mixing stage (NP) in an internal rubber mixer, with no additional ingredients added, for about 3 more minutes at a temperature of about 160° C. The resulting mixture was then mixed in a productive mixing stage (P) in an internal rubber mixer with curatives for about 2 minutes at a temperature of about 120° C. The rubber composition was cooled to below 40° C. between the non-productive mixing steps and between the second non-productive mixing step and the productive mixing step.

The following Table 4 illustrates the cure behavior and various physical properties of the silica-rich rubber compositions based on the basic recipe of Table 3 and reported herein as rubber Samples G through L.

TABLE 4

| | Rubber Samples | | | | | |
|---|---|---|---|---|---|---|
| | Control G | H | I | J | K | L |
| Fatty acids,(phr) | 1 | 3 | 6 | 0 | 0 | 0 |
| Rosin acid (phr) | 0 | 0 | 0 | 1 | 3 | 6 |
| Processing | | | | | | |
| Uncured (G')[1] | 256 | 203 | 184 | 249 | 224 | 187 |
| Wet[2] | | | | | | |
| 0° C. Rebound | 19 | 18 | 19 | 18 | 17 | 15 |
| 23° C. Rebound | 36 | 38 | 34 | 34 | 31 | 28 |
| Handling[3] | | | | | | |
| G' at 10% | 2261 | 1854 | 1598 | 2157 | 2100 | 1477 |
| Modulus at 300% | 10.4 | 9.1 | 8.3 | 10.6 | 9.1 | 7.4 |
| Hot hardness | 60 | 59 | 59 | 59 | 59 | 60 |
| RR (Rolling Resistance)[4] | | | | | | |
| Rebound, 100° C. | 56 | 58 | 61 | 55 | 52 | 51 |
| TD (tan delta) at 100° C., RPA | 0.14 | 0.12 | 0.11 | 0.14 | 0.14 | 0.13 |
| Wear[5] | | | | | | |
| DIN abrasion | 108 | 137 | 135 | 115 | 131 | 143 |
| COF (Coefficient of Friction)[6] | | | | | | |
| Dry | 1.54 | 1.53 | 1.57 | 1.62 | 1.56 | 1.64 |
| Wet | 0.32 | 0.34 | 0.33 | 0.35 | 0.43 | 0.52 |
| Tear | | | | | | |
| Original | 82 | 77 | 76 | 81 | 97 | 135 |

[1]Uncured G' was measured using ASTM D6601 on an RPA 2000
[2]Rebound was measured using ASTM D1054
[3]Modulus at 300 was measured using ASTM D1042
[4]Rebound at 100° C. was measured using ASTM D1415
[5]DIN abrasion was measured using ASTM 596.3
[6]Coefficient of friction (COF) measured using ASTM D1894. COF value for a rubber sample may be measured, for example, on a Model SP-200 slip/peel tester from IMASS, Inc. at six inches (about 15.2 cm) per minutes using a 200 g sled against a substrate surface such as, for example, a polished aluminum surface.

From Table 4 it can be seen in Samples G through I, the increase of fatty acid provides no appreciable change in either of the dry or wet coefficient of friction (COF) values.

However, the coefficient of friction values for Samples J, K and L (which contained the zinc rosinate formed in situ within the rubber compositions as a product of rosin acid, instead of the fatty acid, and zinc oxide) were dramatically improved for wet substrate conditions as compared to Samples G, H and I and also showed a small improvement for dry COF.

Accordingly, it is concluded herein that a footwear rubber sole of a rubber composition containing a zinc soap in the form of zinc rosinate can promote a significantly improved coefficient of friction of the sole's surface intended for contacting or engaging a wet substrate surface while substantially maintaining or improving a coefficient of friction on a dry substrate surface.

While certain representative embodiments and details have been shown for the purpose of illustrating the invention, it will be apparent to those skilled in this art that various changes and modifications may be made therein without departing from the spirit or scope of the invention.

What is claimed is:

1. A footwear rubber sole comprised of a sulfur cured rubber composition which contains zinc rosinate within said rubber composition and on the sole surface intended for ground engagement, wherein said rubber composition contains, based on parts per 100 parts by weight rubber (phr):

(A) at least one conjugated diene-based rubber, the at least one conjugated diene-based rubber being comprised of at least one solution polymerization prepared styrene/butadiene rubber; and (B) zinc soap comprised of zinc rosinate as a product formed in situ within the rubber composition of from about 3 to about 5 phr of zinc oxide and from about 1 to about 6 phr of freely added rosin acid.

2. The footwear rubber sole of claim 1 wherein said zinc soap is comprised of a combination of said zinc rosinate and additional zinc soap comprised of a product of zinc oxide and fatty acid containing at least one of stearic acid, palmitic acid and oleic acid.

3. The footwear rubber sole of claim 1 comprised of, based upon parts by weight per 100 parts by weight rubber (phr):
(A) (100 phr of) at least one conjugated diene-based elastomer,
(B) about 1 to about 10 phr of zinc soap comprised of:
    (1) said zinc rosinate as the product of zinc oxide and rosin acid formed in situ within the rubber composition, or
    (2) a combination of zinc soaps comprised of:
        (a) about 25 to about 95 weight percent of said zinc rosinate, and
        (b) about 5 to about 75 weight percent of zinc salt as the product of zinc oxide and fatty acid formed in situ within the rubber composition, where said fatty acid is comprised primarily of a combination of stearic, palmitic and oleic acids.

4. The footwear rubber sole of claim 1 wherein said rosin acid is comprised of at least one of gum rosin acid, wood rosin acid and tall oil rosin acid, and hydrogenated and disproportionate forms thereof.

5. The footwear rubber sole of claim 1 comprised of a rubber composition which contains from about 2 to about 40 phr of rubber processing oils comprised of:
(A) Petroleum based rubber processing oil,
(B) triglyceride vegetable oil, or
(C) combination of a petroleum based rubber processing oil and triglyceride vegetable oil.

6. The footwear rubber sole of claim 5 wherein said triglyceride vegetable oils are comprised of at least one of soybean oil, sunflower oil, palm oil and rapeseed oil.

7. The footwear rubber sole of claim 1 where said rubber composition contains at least one traction promoting resin comprised of at least one of styrene/alphamethylstyrene resin, coumarone-indene resin, petroleum hydrocarbon resin, terpene polymer, terpene phenol resin and rosin derived resin.

8. The footwear rubber sole of claim 1 wherein said rubber sole rubber composition is provided as being sulfur cured.

9. The footwear rubber sole of claim 1 further comprising at least a second conjugated diene-based elastomer, the at least second conjugated diene-based elastomer being comprised of at least one of cis 1,4-polyisoprene rubber, cis 1,4-polybutadiene rubber, styrene/butadiene copolymer rubber, styrene/isoprene/butadiene terpolymer rubber, isoprene/butadiene rubber and block polymer comprised of styrene/isoprene/styrene or styrene/butadiene/styrene polymer blocks.

10. The footwear rubber sole of claim 1 wherein said elastomer also includes up to about 25 phr of at least one of ethylene/propylene/non-conjugated diene terpolymer rubber, butyl rubber, halobutyl rubber and brominated copolymers of paramethylstyrene and isobutylene and their mixtures.

11. The footwear rubber sole of claim 10 wherein said non-conjugated diene for said terpolymer rubber is comprised of at least one of ethylidene norbornadiene, trans 1,4-hexadiene and dicyclopentadiene.

12. The footwear rubber sole of claim 1 wherein which contains from about 10 to about 120 phr of particulate reinforcing fillers comprised of:
(A) carbon black, or
(B) precipitated silica, or
(C) a combination of rubber reinforcing carbon black and precipitated silica.

13. The footwear rubber sole of claim 1 which contains at least one of clay, talc, and calcium carbonate.

14. The footwear rubber sole of claim 12 which contains a silica coupler for said precipitated silica having a moiety reactive with hydroxyl groups contained on the precipitated silica and another moiety interactive with the conjugated diene-based elastomer(s).

15. The footwear rubber sole of claim 14 wherein said silica coupler is comprised of:
(A) a bis-(3-triethoxysilylpropyl) polysulfide having an average of from 2 to about 4 connecting sulfur atoms in its polysulfidic bridge, or
(B) an organoalkoxymercaptosilane composition.

16. The footwear rubber sole of claim 12 wherein said precipitated silica is provided as a composite of pre-reacted precipitated silica with silica coupler.

17. The footwear rubber sole of claim 12 wherein the reinforcing filler is precipitated silica pre-treated to form a composite thereof with a silica coupling agent comprised of a bis-(3-triethoxywilylpropyl) polysulfide having an average of from 2 to about 4 connecting sulfur atoms in its polysulfidic bridge, or an organoalkoxymercaptosilane composition.

18. An article of footwear containing the rubber sole of claim 1.

* * * * *